United States Patent [19]

Akridge et al.

[11] Patent Number: 4,477,545
[45] Date of Patent: Oct. 16, 1984

[54] ISOSTATIC COMPRESSION METHOD FOR PRODUCING SOLID STATE ELECTROCHEMICAL CELLS

[75] Inventors: James R. Akridge, Parma; Harry Vourlis, Lakewood, both of Ohio

[73] Assignee: Union Carbide Corporation, Danbury, Conn.

[21] Appl. No.: 509,133

[22] Filed: Jun. 29, 1983

[51] Int. Cl.$^3$ .............................................. H01M 6/18
[52] U.S. Cl. .................................. 429/191; 429/218; 29/623.1
[58] Field of Search ............... 429/191, 213, 218, 192, 429/193; 29/623.1

[56] References Cited

U.S. PATENT DOCUMENTS

| | | | |
|---|---|---|---|
| 4,243,732 | 1/1981 | Powers et al. | 429/191 X |
| 4,263,382 | 4/1981 | Louzos et al. | 429/213 |
| 4,333,996 | 6/1982 | Louzos | 429/191 |
| 4,377,624 | 3/1983 | Joshi et al. | 429/191 |

OTHER PUBLICATIONS

S. Geller et al., Crystal Structure and Conductivity of the Solid Electrolyte —$RbCu_4Cl_3I_2$, Physical Review B, 19,5392-5402 (5/15/79).
Refractories USSR, 23, 395 (1982).
P. Popper, Isostatic Pressing, Heyden, Philadelphia (1976).

*Primary Examiner*—Anthony Skapars
*Attorney, Agent, or Firm*—William E. Dickheiser

[57] ABSTRACT

A method for manufacturing solid state electrochemical cells comprising isostatically compressing a cell subassembly comprising a malleable metal anode at a pressure of between about 10,000 and 100,000 psi.

8 Claims, No Drawings

ISOSTATIC COMPRESSION METHOD FOR PRODUCING SOLID STATE ELECTROCHEMICAL CELLS

FIELD OF THE INVENTION

This invention relates to a method for manufacturing solid state electrochemical cells comprising isostatically compressing at least one cell preassembly which preassembly comprises a malleable metal anode selected from the group consisting of alkali metals, alkaline earth metals, aluminum, copper, silver, lead, and alloys or mixtures thereof at a pressure of between about 10,000 and 100,000 psi.

BACKGROUND OF THE INVENTION

Ionic conductivity is usually associated with the flow of ions through a liquid solution of salts. In the vast majority of practical uses of ionic conductors, i.e., as electrolytes for dry cell batteries, the liquid solution is immobilized in the form of a paste or gelled matrix or is absorbed in a separator to overcome the difficulties associated with handling and packaging a liquid. However, even after immobilization, the system is still subject to possible leakage, has a limited shelf life due to drying out or crystallization of the salts and is suitable for use only within a limited temperature range corresponding to the liquid range of the electrolyte. In addition, the use of a large volume of immobilizing material has hindered the aims of miniaturization.

In addition, improved microelectronic circuit designs have generally decreased the current requirements for electronic devices. This in turn has enhanced the applicability of solid electrolyte power sources which usually can deliver currents only in the microampere range. These solid electrolyte systems have the inherent advantages of being free of electrolyte leakage and internal gassing problems due to the absence of a liquid phase. In addition, they also have a much longer shelf life than the conventional liquid electrolyte power sources.

In attempting to avoid the shortcomings of liquid systems, investigators have surveyed a large number of solid compounds hoping to find compounds which are solid at room temperature and have specific conductances approaching those exhibited by the commonly used liquid systems.

However, numerous technological problems are encountered in the construction of totally solid state electrochemical cells, particularly in the establishment of anode/electrolyte interfaces. The low electrode impedances required for good performance of electrical cells can be achieved by bringing the solid surface of the electrode into intimate contact with the solid electrolyte. Traditionally, this contact has been achieved by stacking the cell components in a mold between dies and applying uniaxial force to densify and compress the components. Great uniaxial force is required to deform solid materials. Typically, the construction of high energy density solid state electrochemical cells requires the use of malleable alkali metal or alkaline earth metal anodes. However, the forces necessary to establish satisfactory interfaces, especially anode/solid electrolyte interfaces, exceeds by a large measure the force needed to cause such malleable metal anodes to flow or extrude radially across the cell stack. This flow of metal can often result in the anode contacting the cathode, thereby short circuiting the cell. An additional and equally serious difficulty is the lamination of the solid electrolyte layer when subjected to the high uniaxial forces needed to establish interfaces and densify the solid electrolyte.

Other approaches have been employed in the prior art to establish satisfactory anode/electrolyte interfaces in solid state electrochemical cells. For example, vapor deposition of the anode metal onto the solid electrolyte can provide an acceptable anode/electrolyte interface. Vapor deposition of alkali metals and alkaline earth metals is, however, a hazardous procedure. Another approach involves blending finely divided anode metal with solid electrolyte to produce a high surface area anode and impart a high surface area anode/electrolyte contact. This also often produces an acceptable contact but the necessity of handling finely divided alkali metals or alkaline earth metals poses a serious fire hazard. Additionally, the dilution of the anode metal with solid electrolyte reduces the energy densities of solid state cells.

The problem of insuring good contact between the components of solid state electrochemical cells exists even in those cell systems wherein the electrolyte is formed in situ by the reaction of the cathode and the anode. Thus, U.S. Pat. No. 3,937,635 discloses that, in lithium-iodine cells, air gaps which remain between the cathode and anode after assembly can, through lithium nitride formation, form an internal electrical short circuit in the cell and if the cathode material does not completely contact the anode an abnormally high impedance can build up at the small remaining interface.

Failure to establish satisfactory interfaces may manifest itself in high cell impedance and poor discharge performance. Accordingly, it is an object of the present invention to provide a method for producing solid state electrochemical cells having improved electrode/electrolyte interfaces.

It is another object of this invention to provide a method for the production of solid state electrochemical cells wherein there is improved contact between the solid electrolyte and a malleable metal anode.

It is yet another object of this invention to provide a method for producing a solid state electrochemical cell utilizing high pressures wherein the dangers of extrusion or radial flow of the anode metal from its desired location in the cell stack and of lamination of the solid electrolyte are reduced.

The foregoing and additional objects will become more fully apparent from the following description of the invention.

SUMMARY OF THE INVENTION

This invention relates to a process for the manufacture of solid state electrochemical cells, which process comprises isostatically compressing at least one cell preassembly comprising a malleable metal anode selected from the group consisting of alkali metals, alkaline earth metals, aluminum, copper, silver, lead, and alloys or mixtures thereof at a pressure of between about 10,000 and about 100,000 pounds per square inch.

In another aspect, this invention is directed to a method for producing solid state electrochemical cells comprising the steps of:

(a) forming a cell preassembly comprising a malleable metal anode selected from the group consisting of alkali metals, alkaline earth metals, aluminum, copper, silver, lead, and alloys and mixtures thereof;

(b) isostatically compressing the cell preassembly at a pressure of between about 10,000 and about 100,000 pounds per square inch; and (c) finishing the isostatically compressed cell by sealing said cell into a cell container.

In some applications it is preferable that the cell preassembly be subjected to isostatic pressing at an elevated temperature in step (b). The particular elevated temperature selected will vary according to the thermal properties of the anode metal and the electrolyte used. Such temperatures will be well known to those skilled in the art.

The duration of the pressing in step (b), whether or not the assembly is heated during said step, may be relatively short (e.g., about one minute or less) so long as the desired electrode/electrolyte interfaces are created.

As used herein the term "cell preassembly" refers to an assemblage of the components of a solid state electrochemical cell, which components comprise a malleable alkali metal or alkaline earth metal anode. Typically, the cell preassembly is comprised of a malleable metal anode, a solid state electrolyte, and a solid state cathode. However, in cell systems wherein the electrolyte is formed by the reaction of the anode and the cathode, a distinct initial electrolyte layer is not present. The isostatic compression method of this invention may also be used to compress a malleable metal onto a solid state electrolyte. Further, battery stacks composed of a multiplicity of cells may also be formed by the method of this invention.

Among the malleable alkali metal and alkaline earth metal anodes which may be employed are lithium, sodium, potassium, rubidium, cesium, magnesium and calcium. In addition, malleable anodes which are mixtures or alloys of alkali metal and alkaline earth metals may be employed.

The process of this invention may be used to assemble solid state cells using a great variety of solid electrolytes and cathodes. Illustrative of the solid electrolytes which may be used are lithium iodide, silver iodide, silver bromide, lithium bromide, tetrasilver rubidium pentaiodide, lithium aluminum tetrachloride, tetrasilver potassium tetraiodide cyanide, tetrasilver rubidium tetraiodide cyanide, sodium iodide, sodium bromide, dilithium silicon trisulfide, tetralithium phosphorous heptasulfide, and mixtures thereof. Moreover, the ternary fluoride-containing solid state electrolytes of U.S. Pat No. 4,352,869 may also be employed. In addition, the solid electrolytes of U.S. patent application Ser. No. 509,132, filed concurrently herewith, which electrolytes are of the composition $SiS_2 \cdot xLi_2S \cdot yLiI$ wherein x is from 0.8 to 1.5 and y is from 0 to about 2 may be used. Representative of the cathode materials which may be employed are iodine, titanium sulfides, antimony sulfides, iron sulfides, halogen charge-transfer complexes as disclosed in U.S. Pat. Nos. 3,660,164, 4,263,382, and 4,333,996; and mesophase pitch-containing charge-transfer complexes as disclosed in U.S. Pat. No. 4,243,732.

A particularly desirable combination of solid state cell components includes lithium as the anode, titanium sulfide as the cathode, and $2.5 \text{LiI} \cdot \text{Li}_4\text{P}_2\text{S}_7$ as the solid electrolyte.

The cell preassembly is generally formed as follows. The electrolyte, typically in the form of a powder, is premolded into a low density pellet by conventional uniaxial compression at about 3000 to about 4000 pounds per square inch. A low density cathode pellet, which may contain a minor portion of electrolyte, is similarly formed and the two pellets are compressed together by subjecting them to uniaxial pressures of between about 500 and about 15,000 pounds per square inch. Alternatively and preferably, the cathode pellet can first be uniaxially molded as described above. The solid electrolyte in powder form is then distributed evenly over the cathode pellet and pressed onto said pellet applying a uniaxial pressure of between about 500 and about 15,000 psi. The cell preassembly is completed by placing the malleable metal anode onto the solid electrolyte surface and pressing said anode into such surface at uniaxial pressures of between about 50 and about 400 pounds per square inch. Preferably, all the above operations are carried out in a dry box under an inert atmosphere in the absence of moisture and oxygen.

The cell preassembly is then subjected to isostatic compression at a pressure of between about 10,000 and about 100,000 pounds per square inch. Isostatic compression is a commercially utilized technique wherein three-dimensional forces are uniformly applied to the object under compression. The isostatic compression process is described in detail in Refractories USSR, 23, 395 (1982) and Propper, *Isostatic Pressure,* Heyden, Philadelphia (1976).

In the present invention the isostatic compression usually involves encasing the cell preassembly in a protective plastic medium. Illustrative of the plastics which may be employed are polyethylene, polypropylene, nylon and the like. Preferably the subassembly is enclosed in a heat-sealed polyethylene casing. The encased preassembly is inserted into the pressure chamber which is then sealed. The pressure-transmitting medium can be a liquid, gas or soft plastic material. Isopropyl alcohol is a preferred pressure-transmitting medium. The preassembly is isostatically compressed for a period sufficient to ensure good electrode/electrolyte interfacial contact.

The application of isostatic pressure by an inert gas such as helium or argon does not require enclosing the anode/electrolyte/cathode assembly in a sealed bag but rather requires only that direct shorting of the assemblies be prevented.

Following the isostatic compression, the overwrapped solid state cell is returned to a dry box atmosphere, the plastic enlcosure is removed and the compressed anode/solid electrolyte/cathode assembly is inserted into a suitable container.

EXAMPLE

The following Example serves to give a specific illustration of the practice of this invention but is not intended in any way to limit the scope of this invention.

Several miniature cells (Cell Sample A), each having 1.8 square centimeters electrode active area, were constructed with each cell containing 0.055 ampere hours of cathode ($TiS_2$) capacity and 0.07 ampere hours of anode (lithium) capacity as follows. A cathode pellet was formed by blending $TiS_2$ and the solid electrolyte (2.5 $LiI \cdot Li_4P_2S_7$) together in a ratio of 85 weight percent electrolyte and uniaxially compressing the mixture in a mold at about 4000 psi. About 0.16 gram of solid electrolyte powder was distributed evenly over the cathode pellet and pressed onto the cathode via uniaxial pressure of 13,500 psi. A lithium foil anode was placed onto the solid electrolyte and the anode/solid electrolyte interfacial contact established by uniaxially pressurizing the assembly at 400 psi thereby forming the cell preassemblies. All operations were carried out in the absence of moisture and oxygen in a dry box. The cell preassemblies were heat sealed in a polyethylene bag and isostatically compressed at the pressures listed in Table I, utilizing isopropyl alcohol as the pressure medium, for about 60 seconds. The compressed cells were finished by sealing in a conventional cylindrical steel container 0.787 inch in diameter and 0.063 inch in height and provided with a cover.

Additional miniature cells (Cell Sample B) were constructed in a manner similar to that above except that the cells were isostatically compressed at a temperature of about 90° to 100° C.

As controls, several additional cells were constructed utilizing the components above except that the cathode and solid electrolyte were uniaxially compressed (Cell Sample C) or isostatically compressed (Cell Sample D) at the pressures listed in Table I and the lithium anode compressed onto the cathode/solid electrolyte assembly at a uniaxial pressure of 400 psi.

Values of cell current densities at specific voltages were obtained by extrapolation from a plot of cell voltage after 2 seconds on various resistive loads vs. cell current density. The calculated current densities to 2.0, 1.6 and 1.1 volts are shown in Table I.

TABLE I

| | Current Density of Compressed Cell Components | | | | | | | | | |
|---|---|---|---|---|---|---|---|---|---|---|
| | Cell Sample | | | | | | | | | |
| | A Isostatic (cold) Li + Solid Electrolyte + Cathode at: | | | B Isostatic (at ~90° to ~100° C.) Li + Solid Electrolyte + Cathode at: | C Uniaxial Lithium 400 psi Cathode + Solid Electrolyte at: | | | D Isostatic/Uniaxial Li 400 psi Uniaxial Cathode + Solid Electrolyte Isostatically at | | |
| Current Density μA/cm² to | 13,500 psi | 27,000 psi | 54,000 psi | 54,000 psi | 13,500 psi | 27,500 psi | 54,000 psi | 13,500 psi | 27,000 psi | 54,000 psi |
| 2 volt cutoff | 2,700 | 3,200 | 4,500 | 7,000 | 2,000 | 2,700 | 3,600 | 1,500 | 2,300 | 3,300 |
| 1.6 Volt cutoff | 6,000 | 7,000 | 9,400 | 14,000 | 4,200 | 5,400 | 7,000 | 3,000 | 4,800 | 5,800 |
| 1.1 Volt cutoff | 9,000 | 11,500 | 15,000 | 20,000 | 5,700 | 9,000 | 11,000 | 4,800 | 7,200 | 10,500 |

The above results indicate that the cells wherein all three cell components were isostatically compressed (Cell Samples A and B) delivered higher currents than those assembled according to the other two construction procedures (Cell Samples C and D). The pulse discharge performance of the samples where the anode/solid electrolyte interfaces were established via isostatic pressure is better than the performance of the other two constructions at any given assembly pressure and voltage cutoff. Moreover, examination of the results for Cell Sample B indicates that substantial additional improvement can be obtained by employing isostatic pressure at elevated temperature to the cell preassemblies.

What is claimed is:

1. A method for manufacturing solid state electrochemical cells comprising isostatically compressing at least one cell preassembly which preassembly comprises a malleable metal anode selected from the group consisting of alkali metals, alkaline earth metals, aluminum, copper, silver, lead, and alloys and mixtures thereof at a pressure of between about 10,000 and about 100,000 pounds per square inch.

2. A method for producing solid state electrochemical cells comprising the steps of:
   (a) forming a cell preassembly comprising a malleable metal anode selected from the group consisting of alkali metals, alkaline earth metals, aluminum, copper, silver, lead, and alloys and mixtures thereof;
   (b) isostatically compressing the cell preassembly at a pressure of between about 10,000 and about 100,000 pounds per square inch; and
   (c) finishing the isostatically compressed cell by sealing said cell into a cell container.

3. The method of claim 2 wherein the cell preassembly of step (a) is encased in a plastic medium prior to its isostatic compression in step (b).

4. The method of claim 2 wherein isopropyl alcohol is employed as the pressurizing medium in step (b).

5. The method of claim 2 wherein the cell preassembly is comprised of a lithium anode, a $TiS_2$ cathode and 2.5 $LiI.Li_4P_2S_7$ electrolyte.

6. The methods of claim 5 wherein the cell preassembly is heated to between about 90° C. and about 100° C. in step (b).

7. The method of claim 2 wherein the cell preassembly comprises an electrolyte of the formula $SiS_2.xLi_2S.yLiI$ where x is from 0.8 to 1.5 and y is from 0 to about 2.

8. An electrochemical cell produced in accordance with the method of claim 2.

* * * * *